INVENTORS
RALPH W. CARP
DEWEY W. EPPLEY
DONALD W. HOWARD
BY Plante, Arens, Hartz & O'Brien
ATTORNEY INVENTORS
RALPH W. CARP
DEWEY W. EPPLEY
DONALD W. HOWARD
BY Plante, Arens, Hartz, & O'Brien
ATTORNEY

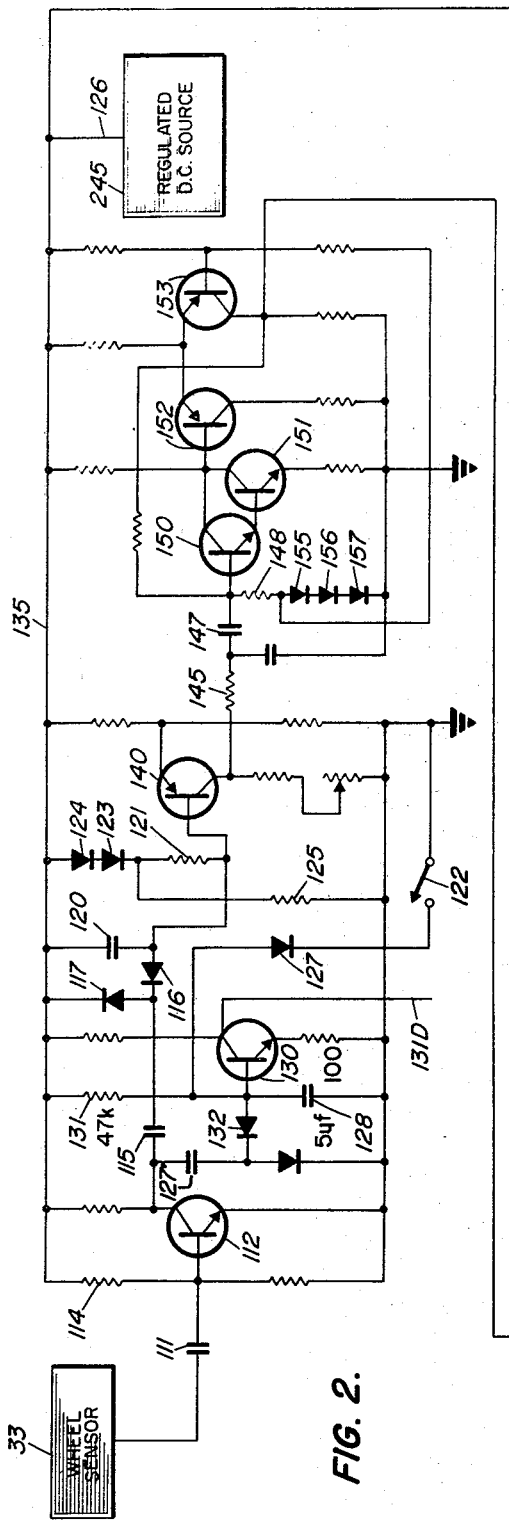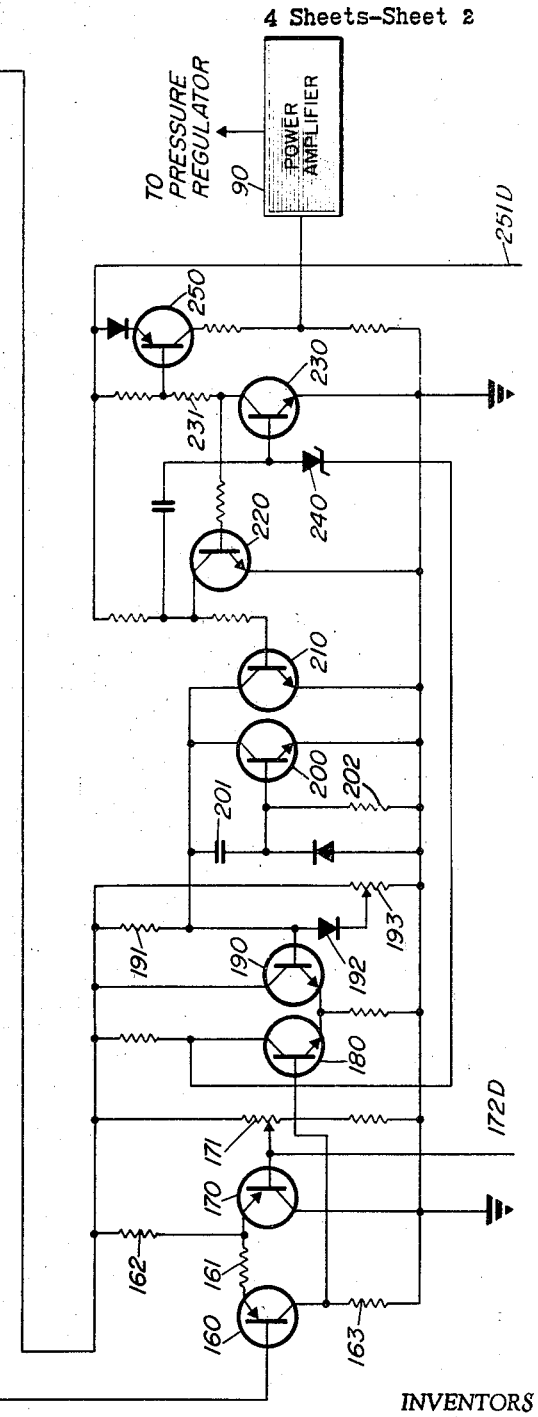
FIG. 2.
INVENTORS
RALPH W. CARP
DEWEY W. EPPLEY
DONALD W. HOWARD
BY Plante, Arens, Hartz & O'Brien
ATTORNEY March 10, 1970  R. W. CARP ET AL  3,499,689
ANTISKID SYSTEM
Filed Oct. 9, 1967  4 Sheets-Sheet 3

United States Patent Office 3,499,689
Patented Mar. 10, 1970

3,499,689
ANTISKID SYSTEM
Ralph W. Carp, 6643 Marott Drive, Baltimore, Md.
21207; Donald W. Howard, 24696 Adams Road,
South Bend, Ind. 46628; and Dewey W. Eppley,
452 N. Main St., Nappanee, Ind. 46550
Filed Oct. 9, 1967, Ser. No. 673,651
Int. Cl. B60t 8/08
U.S. Cl. 303—21
27 Claims

ABSTRACT OF THE DISCLOSURE

An antiskid braking system for automobiles or trucks utilizing a control channel for each wheel to be controlled, wherein the rotational velocity of the wheel is sensed and electronically differentiated to generate a D.C. voltage level correlative to wheel acceleration. This D.C. voltage level is compared to a reference level to produce an error voltage which is applied to a pulse modulator to modulate a train of pulses. The pulses generated are then applied to a solenoid valve winding of a vacuum actuated hydraulic pressure modulator which is interposed in the hydraulic line between the master cylinder and the wheel cylinders of the wheel being controlled. The solenoid valve opens in response to the pulses to admit air into the modulator body wherein a diaphragm and a cooperating displacement rod are repositioned in accordance with the volumetric rate of air admitted. The displacement rod cooperates with a ball valve to allow free communication between the master cylinder and wheel cylinders during periods of pulse absence or minimum pulse energy content. For increased pulse energy content, the displacement rod is positioned so as to allow the ball valve to seal the hydraulic pressure fluid in the wheel cylinders, the rod further attenuating the fluid pressure proportionally to pulse energy content. Additionally, electronic logic circuitry is provided to vary the reference level of a channel so as to provide maximum pulse energy content should the velocity of the controlled wheel fall below a threshold limit and also to disable all control channels a predetermined time delay after the last sensed wheel falls below the threshold limit, providing that during the time delay no wheel accelerates to a velocity above the threshold limit.

BACKGROUND OF THE INVENTION

Brakes on most automobiles will lock up so as to prevent wheel rotation with respect to the vehicle, at 600 to 700 pounds per square inch pressure in the braking system's hydraulic fluid. A man and even a woman can easily develop a braking pressure well in excess of this lock-up pressure, with the result that in a crisis, under the stress of a panic stop, the vehicle operator will apply maximum braking force to the brake pedal, building up a lock-up pressure in the hydraulic brake lines, causing the wheels to lock. It is well known, that at the moment of wheel lock in a moving vehicle, the coefficient of friction between the tire and the contiguous surface of the road bed decreases, causing skidding of the vehicle and resulting in increased stopping distance of the vehicle. Additionally, the operator of a skidding vehicle is unable to control the directional movement of the vehicle until the directional movement controlling wheels, usually the front wheels, have stopped skidding and are rotating. Drivers are cautioned to steer in the direction of a skid and to pump the brakes, thereby allowing the control wheels to resume rotation so that directional control returns to the operator upon release of the brake pressure, and to take advantage of the increased braking torque of the rotating braked wheel upon reapplication of the brake pressure.

Another phenomenon which arises because of the lower traction between the tire and the road surface, while the vehicle is in a skid, is the impaired directional stability of the vehicle. This phenomenon is evidenced by the skewing of the skidding vehicle which is caused usually by slight lateral unbalanced forces on the vehicle, such as isolated spots in the road surface of higher coefficient of friction with a tire or crowning of the road, which allows an unbalanced gravitational force to be applied laterally to vehicle movement.

Certain antiskid braking systems utilizing both mechanical and electro-mechanical modes of operation have been devised. The purely mechanical antiskid braking systems generally comprise a deceleration sensitive weight which is responsive to the rotational deceleration of a wheel so as to activate a brake fluid dumping valve, should wheel deceleration exceed a fixed predetermined value and, alternately, allowing the brakes to be applied when wheel deceleration is below the predetermined value. A major drawback of the purely mechanical system, aside from the inherently slower response of a mechanical system when compared to an electro-mechanical system, is the tendency of the wheel to remain locked if it becomes locked since, at the instant of lock-up, wheel rotational deceleration drops to zero thereby preventing actuation of the brake fluid dumping valve and allowing full brake pressure to be applied.

Electromechanical systems have been in use which use the deceleration of a wheel to generate an error signal which is applied to a hydraulic fluid valve of the displacement type. The form of the error signal is such as to cause the hydraulic fluid valve to pass rapidly through any intermediate stage at which the fluid pressure might be modulated and to operate essentially at one extreme or the other, that is, with the brakes either fully applied or fully released. This type of operation is also characteristic of the purely mechanical systems.

SUMMARY OF THE INVENTION

Accordingly, an antiskid braking system has been devised for use on wheeled vehicles which will cause a braked vehicle to come to a controlled stop by modulating the hydraulic brake fluid pressure to maintain a critical wheel deceleration. Additionally, this new antiskid braking system is compatible with conventional hydraulic braking systems and installed in the vehicle as an adjunct thereto and performing its operational functions therethrough. The new system is fail-safe in that failure of the antiskid system will cause a reversion of the braking functions to the conventional braking system which will thereafter operate in the normal manner. It also contains logic circuitry to sense lock-up of a wheel.

The antiskid braking system, which is the subject of this invention, utilizes one essentially independent channel for each wheel or group of wheels which it is desired to control, the channels being interconnected only by the hydraulic fluid lines of the conventional braking system and by logic circuits which sense impending or actual lock-up of a wheel to initiate action to release the lock-up if vehicle speed is not simultaneously zero and additionally to deactivate the antiskid system and transfer full brake control to the conventional braking system when vehicle speed drops to a level at which danger of skidding has passed.

A counter mounted on or in close proximity to a wheel to be controlled senses the velocity of that wheel so as to provide the basic input to the control channel associated with that wheel. This velocity is differentiated to obtain an acceleration signal which is compared with a predetermined reference D.C. voltage to generate an error signal. The error signal is then converted to a form which can be used by a vacuum actuated pressure modulator, connected into the brake line between the wheel being controlled by that channel and the master cylinder, to control the brake hydraulic fluid pressure applied to the brake cylinders of the wheel. During an ordinary stop the deceleration of any wheel does not approach the aforementioned predetermined reference value so that the antiskid braking system produces no error signal. In this case, the pressure modulator valve is inoperative and fully open, the hydraulic fluid passing unattenuated therethrough. During a panic stop wherein the deceleration of a wheel exceeds the reference value, an error signal is generated and applied in modified form to a solenoid valve in the pressure modulator which bleeds air to one side of a pressure responsive, spring loaded diaphragm which, when the pressure modulator is inoperative, has vacuum drawn equally from both sides thereof. With air pressure on one side of the diaphragm, the diaphragm is deflected against the spring thereby, through a linkage, closing the hydraulic connection between the master cylinder and the wheel, trapping the hydraulic fluid in the wheel brake cylinders at that time. The pressure in the wheel brake cylinders therefore remains constant regardless of how hard the operator has depressed the brake pedal. If the error signal continues to increase, indicating that wheel deceleration is greatly in excess of the reference, means are provided in the pressure modulator to modulate the hydraulic fluid pressure in response thereto, thereby decreasing the fluid pressure in the wheel brake cylinders. If wheel deceleration should thereafter fall below the reference value, the pressure modulator will increase the wheel brake cylinder fluid pressure to increase the braking action. Built in system time constants continually adjust the braking hydraulic pressures to the condition of the road surface and tires, in a manner to be later explained, so as to apply maximum braking torque to the wheel.

BRIEF DESCRIPTION OF THE DRAWINGS

FIG. 2 is a schematic of a single control channel.

DESCRIPTION OF THE PREFERRED EMBODIMENT

Figure 1:
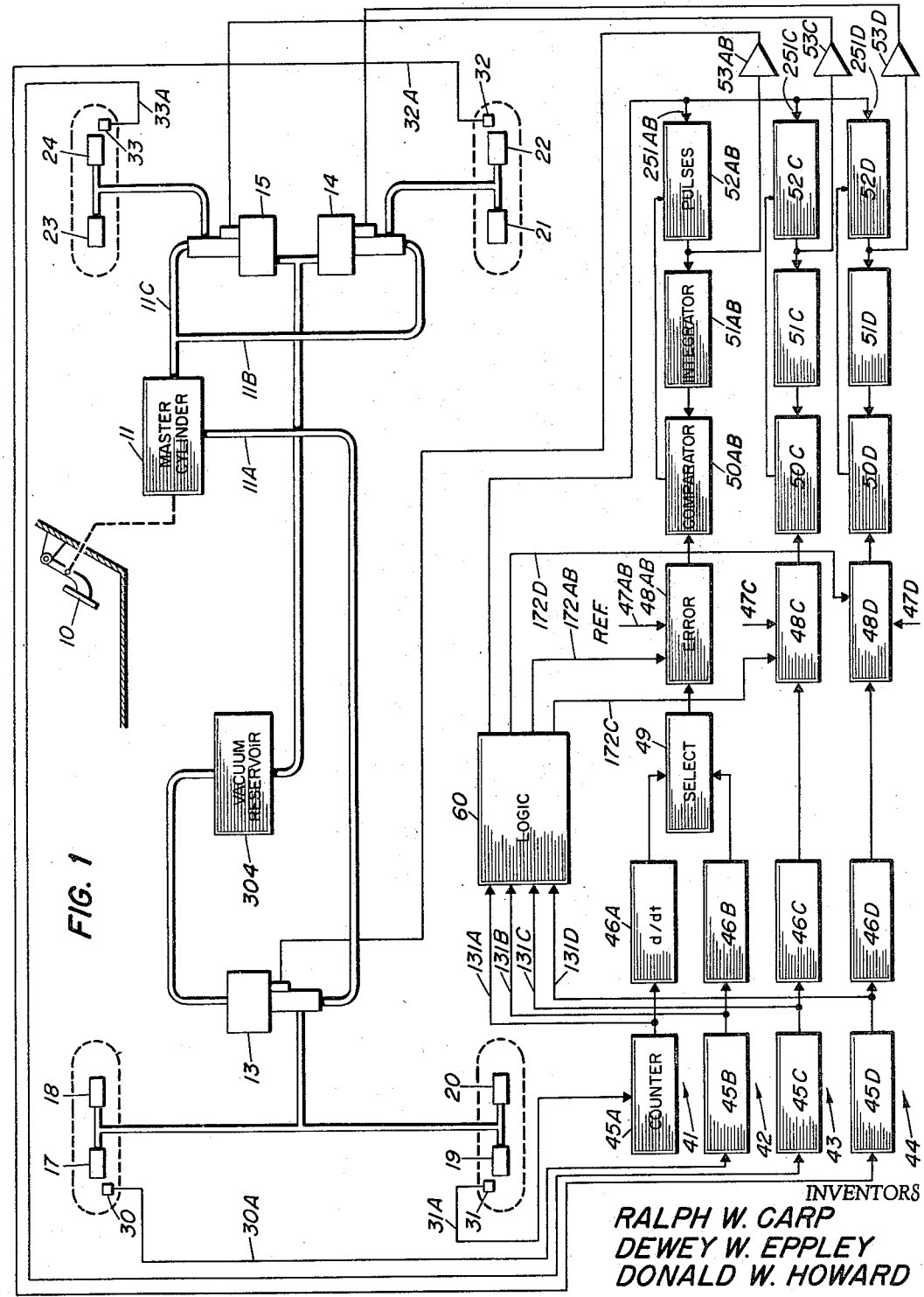
FIG. 1 is a functional block diagram of an antiskid system having sensors on each wheel and pressure modulators controlling each front wheel individually and the rear axle.

Referring to FIG. 1, a brake pedal 10 may be depressed to pressurize the hydraulic fluid in master cylinder 11 which thereby supplies a fluid pressure in hydraulic lines 11A, 11B and 11C in the conventional manner. Each hydraulic line has interposed in its path a vacuum actuated pressure modulator 13, 14 or 15 which, when the antiskid device is inoperative, allows hydraulic pressure to pass therethrough unimpeded, as will be later explained, to wheel brake cylinders 17 to 24. Wheel speed sensors 30 to 33, one mounted on and sensing the rotational velocity of each wheel, generate pulses linearly correlative to wheel velocity, which information is supplied over electrical lines 31A, 30A, 32A and 33A to control channels 41, 42, 43 and 44, respectively. The velocity signal in each channel is converted to a D.C. voltage level in counters 45A, 45B, 45C and 45D. Any change in the D.C. level produced, indicating a change in wheel velocity, is processed by differentiators 46A, 46B, 46C and 46D to produce a signal correlative to wheel acceleration, which signal in channels 43 and 44 is compared with predetermined reference voltage levels 47C and 47D in error generators 48C and 48D to generate error signals. However, the acceleration signals developed in channels 41 and 42 are applied to gate 49 which allows only the larger signal to pass therethrough so as to be applied to error generator 48AB where it is compared with predetermined reference voltage level 47AB to generate an error signal. The error signals are applied to and control pulse modulators which comprise, in the case of channel 44, comparator 50D, integrator 51D and pulse generator 52D. The channel, 41 or 52, generating the larger acceleration signal controls the pulse modulator comprising comparator 50AB, integrator 51AB and pulse generator 52AB. In this manner, the rear wheel having the higher rate of velocity change will control the operation of the pulse modulator. In the pulse modulator of a typical control channel, for example, channel 44, a pulse generator 52D generates a train of pulses which are amplified by driver 53D and then applied to pressure modulator 14. The train of pulses is also sampled by and integrated in integrator 51D to produce a D.C. level correlative to the information content of the train. The integrator output is compared with the error signal output of error generator 48D in comparator 50D, the output of which constitutes a correction signal which is fed back to the pulse generator to modulate the pulse train. The pulses may be modulated with respect to pulse repetition rate, pulse width, pulse code, etc., the criterion as to the pulse modulation employed being the ability of the pressure modulator to respond to the pulses so as to produce a truly modulated hydraulic fluid pressure.

Logic circuitry 60 is also included to collectively disable all pulse generators and individually vary the references of the error generators in a manner to be described.

Referring to FIG. 2, sensor 33 may suitably be a variable reluctance alternating current type generator providing a signal having a frequency varying directly as the rotor speed and consequently as the wheel speed, which signal is impressed across blocking capacitor 111 to the base of limiter transistor 112 which is normally biased into saturation by resistor 114.

Negative half-cycles generated by sensor 33 bias transistor 112 non-conductive. The collector voltage of transistor 112, therefore, consists of pulses at approximately the regulated source voltage and of fixed amplitude with a frequency proportional to wheel speed. These speed pulses are applied to the counter circuit of the energy storage type comprising diodes 116 and 117 and capacitors 115 and 120. A voltage proportional to actual wheel speed appears across capacitor 120, shunted by resistor 121 and temperature compensating diodes 123 and 124 forward biased by resistor 125.

Transistor 130 at low wheel speeds is biased on by the large resistance of resistor 131 which causes diode 132 to be reversed biased, thereby allowing capacitor 128 to charge to almost full regulated D.C. voltage appearing on line 135. Speed pulses also appear across capacitor 127′ practically identical to the speed pulses appearing simultaneously across capacitor 115. These speed pulses applied to capacitor 127′ cause intermittent forward biasing of diode 132 with resultant current pulses being drawn from capacitor 128. At low wheel speed and hence low speed pulse repetition rate, capacitor 128 can recharge through resistor 131 rapidly enough to hold transistor 130 in the saturated on state. However, as the wheel speed increases, more current per unit time is drawn out of capacitor 128 than can be supplied to it through resistor 131 with the result that transistor 130 base voltage drops and transistor 130 drops out of saturation. The value of resistor 131 and capacitor 128 determine the speed pulse repetition rate at which transistor 130 drops out of saturation. Additionally, a change of speed pulse repetition rate of 25 pulses per second will cause transistor 130 to go from full on to full off. In a practical anti-skid channel a wheel speed change of ¼ mile per hour produces a speed pulse repetition change of 25 pulses per second. It can be seen that, by proper design, transistor 130 can be held conductive when the wheel speed is below a threshold value, and can be made sharply non-conductive when the wheel speed exceeds the threshold value. When transistor 130 is conductive, the transistor collector voltage is close to ground. When the transistor is turned off, as when wheel threshold speed is exceeded, collector voltage approaches the regulated D.C. voltage level on line 135. Transistor collector voltage is sensed in logic circuit 60 through line 131D wherein it is processed, in a manner to be explained below, to ensure that the low wheel speed is not the result of a locked wheel condition. If switch 122 is closed, grounding transistor 130 base through diode 127, transistor 130 is biased off, thereby increasing its collector voltage as though threshold speed were exceeded.

The voltage appearing across capacitor 120, which, as has been explained, is proportional to wheel speed, is amplified in the normal manner by transistor 140, whose output voltage is coupled through resistor 145 to a differentiator comprising capacitor 147 and resistor 148 so that the voltage appearing on the base of transistor 150 is the first derivative of a voltage proportional to wheel speed which in essence means the transistor base voltage is proportional to wheel acceleration. Temperature compensation is provided by diodes 155, 156 and 157. This voltage is amplified in a linear derivative amplifier comprising transistors 150, 151, 152 and 153 whose gain is predetermined in the conventional manner to be a given voltage level per $g$ of wheel deceleration, where $g$ is 32 ft./sec.$^2$ referenced to a point on the tire at the tire/road surface interface.

The derivative amplifier output is applied directly to the base of transistor 160 which along with transistor 170 comprises a differential amplifier.

Recent studies have shown that a wheel deceleration in excess of 2.0$g$ indicates that wheel lock-up is imminent and the brake pressure should be removed; whereas a wheel deceleration of less than 0.8$g$ indicates that there is no immediate danger of wheel lock-up and the braking pressure, as developed by the vehicle operator, should not be attenuated. At wheel decelerations between these two limits, optimum braking effect is obtained if the braking pressure developed by the vehicle operator is attenuated somewhat. Of course, further studies of the deceleration of a braked vehicle might show that other, more optimum deceleration limits are desirable. It will be clear upon further reading of this disclosure that rather wide deceleration limits can be set into this system, and that it is even possible to make the limits somewhat dependent upon actual wheel speed should these studies show that even better braking characteristics can be obtained thereby. Accordingly, a voltage level is set onto the base of transistor 160, which corresponds to the voltage developed by the derivative amplifier when wheel deceleration reaches the deceleration at which lock-up is imminent and brake pressure should be released. With our present knowledge this deceleration is believed to be 2.0$g$. In this embodiment the corresponding voltage is 4.7 volts. Potentiometer 171 is then varied to adjust the reference voltage set onto the base of transistor 170 to produce a transistor 160 collector voltage which, when applied to the base of transistor 180, will cause that transistor to turn off for reasons to be made clear below. In this embodiment, this is 0.75 volt. In order to make the deceleration limits dependent upon actual wheel speed it is merely necessary to couple the wheel speed signal appearing on the collector of transistor 140 to one side of potentiometer 171 through a suitable attenuator. Resistors 161, 162 and 163 are chosen for proper gain of transistor 160, so that with a voltage corresponding to wheel deceleration at which there is no immediate danger of lock-up set on the base of transistor 160, the collector voltage reaches a value which, when applied to the base of transistor 180, causes that transistor to be on thereby dropping its collector voltage toward ground. Conversely, when transistor 180 turns off, as would occur when wheel deceleration reaches and exceeds 2.0$g$, transistor 180 collector voltage rises to a value approaching the regulated supply voltage on line 135, allowing Zener diode 240 to conduct thereby triggering the one-shot comprising transistors 220 and 230 to generate a negative-going pulse having a predetermined time base at the collector of transistor 230 which is applied through resistor 231 to the base of transistor 250, thereby producing a positive-going pulse at the collector of transistor 250.

Similarly, the positive-going pulse generated at the collector of transistor 220 turns on transistor 210. The trailing edge of the aforementioned positive-going pulse turns off transistor 210 and turns on transistor 200 which, together with capacitor 201 and resistor 202, comprise a Miller integrator. The Miller integrator ramp voltage is applied to the base of transistor 190. With the ramp voltage below the voltage applied to the base of transistor 180, which voltage it will be remembered is a measure of the deceleration of the wheel, transistor 190 is fully off, transistor 180 is fully on and Zener diode 204 is off. As the ramp voltage continues to rise until it exceeds transistor 180 base voltage, transistor 190 turns on full and transistor 180 turns off, thereby turning on Zener diode 240 triggering the one-shot so as to repeat the cycle just described. It can now be understood that transistor 160 collector voltage, which is a measure of wheel deceleration, is a triggering level which determines the length of time the Miller integrator will run. Since the turning off of the Miller integrator initiates a pulse and the trailing edge of the pulse starts the Miller integrator, it can be seen that the length of time that the Miller integrator is on, and hence, the pulse repetition rate, is determined by the wheel deceleration. This can be aptly described as a pulse repetition rate modulation system wherein information as to the deceleration of a wheel is contained in the spacing of a train of constant time base pulses, pulse spacing decreasing as deceleration increases. At or in excess of the upper limit of wheel deceleration where lock-up can be considered to be imminent (2.0$g$), transistor 180 base voltage is less than transistor 190 base voltage as determined by the voltage divider network consisting of resistor 191 and 193 and diode 192. Transistor 190, therefore, does not turn off and transistor 180 cannot turn on, thereby maintaining Zener diode 240 in an on condition so that a continuous voltage, of amplitude equal to pulse amplitude, appears on the collector of transistor 250.

As has been discussed, a maximum voltage which can be developed on transistor 160 collector corresponds to a lower limit of wheel deceleration at which lock-up is not immediately probable. Since this is also the maximum possible transistor 180 base voltage, the Miller integrator will run for the maximum length of time resulting in the lowest possible pulse repetition rate. An absolute maximum pulse repetition rate can be set by varying the bias on limiter diode 192 with potentiometer 193. The integrator will then run until either transistor 180 base voltage causes it to terminate or diode 192 conducts.

Figure 3:
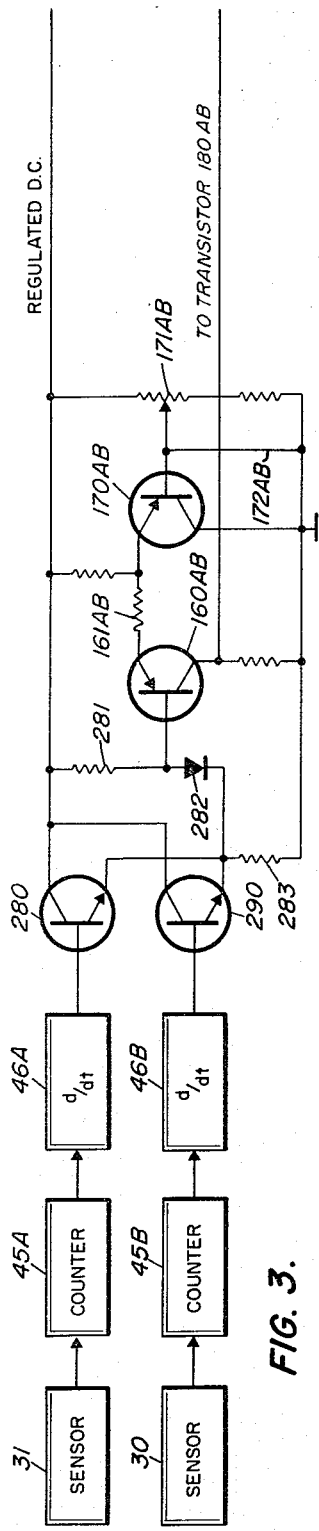
FIG. 3 is a schematic of a circuit for combining control channels to control a group of wheels in accordance with the most rapidly decreasing wheel speed.

Pulses appearing at transistor 250 collector are amplified in power amplifier 90. It is sometimes advantageous to sense the deceleration of each rear wheel individually but to allow the rear wheel having the maximum instantaneous value of acceleration to control the rear axle. A rear axle select circuit as shown at FIG. 3 is used to select the controlling rear wheel. A sensor 30 is attached to and senses speed of the vehicle left rear wheel which information is processed by counter 45B and differentiator 46B to produce a voltage correlative to the left rear wheel deceleration. Similarly, sensor 31 is attached to and senses the speed of the vehicle right rear wheel with counter 45A and differentiator 46A producing a voltage correlative to right rear wheel deceleration. The output of differentiator 46A is connected to the base of emitter-follower 280, while the output of differentiator 46B is connected to the base of emitter-follower 290. The emitters of the emitter-followers are joined and the output taken therefrom. The higher emitter-follower base voltage appears at the emitters of both followers, thereby back-biasing and turning off the emitter-follower having the lower base voltage. The voltage divider consisting of resistors 281 and 283 and diode 282 insure that the input to the base of transistor 160 is unattenuated by the rear axle select circuit.

Those circuit elements shown on FIG. 3 which are designated by numerals having an AB suffix correspond to similarly enumerated circuit elements shown in FIG. 2. In this manner, the proper connection of circuitry following the rear axle select circuit can be easily determined.

Figure 4:
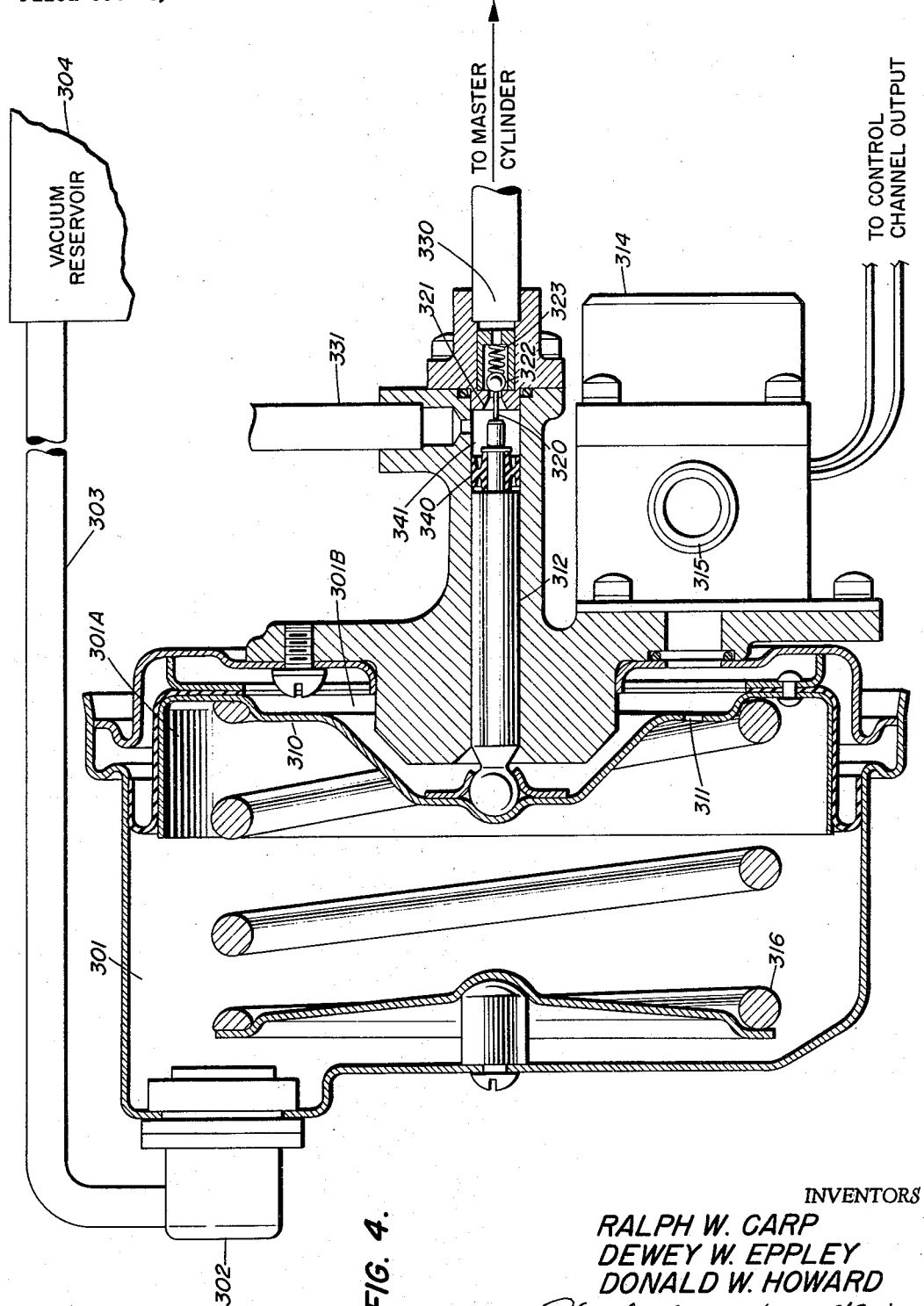
FIG. 4 is a view of a pressure modulator.

The pulses generated in a control channel are applied to a fluid pressure modulator as shown in FIG. 4. The interior of the pressure modulator 301 communicates through check-valve 302 and vacuum conduit 303 with a vacuum reservoir 304. A rubber diaphragm 310 divides modulator interior 301 into two chambers 301A and 301B. A solenoid valve 314 having a winding connected to receive the output pulses of a control channel operates when energized in response thereto to admit atmospheric air to the interior 301 of the modulator. With valve 314 deenergized, no atmospheric air enters the modulator so that the vacuum on each side of diaphragm 310 is balanced. A spring 316 biases diaphragm 310 to the right. As the solenoid valve, in response to the train of control pulses, opens and closes air is admitted into chamber 301B and through orifice 311 into chamber 301A. The amount of air entering the modulator per given time period is correlative to the control pulse repetition rate which causes the solenoid valve to open and close rapidly in response thereto. Air entering the modulator through the solenoid valve creates an unbalanced force across the diaphragm 310 because of the restriction to air flow presented by orifice 311, which forces diaphragm 310 to the left against its biasing spring, to a new equilibrium position. A displacement rod 312 is connected at one end to the diaphragm and terminates at the opposite end in axially located pin 320 which, extending through valve seat 321, abuts valve ball 322. With diaphragm 310 all the way to the right corresponding to minimum pulse repetition rate, valve ball 322 is lifted from valve seat 321 allowing free communication of hydraulic brake fluid from the master cylinder through valve ports 330 and 331 to the wheel cylinder. As the pulse repetition rate increases, diaphragm 310, as explained, moves to the left to a new equilibrium position, thereby moving abutting pin 320 to the left allowing spring 323 to force ball 322 against seat 321, thereby isolating the master cylinder from the wheel cylinder and trapping a fluid pressure in the wheel cylinder. As pulse repetition rate increases still further, diaphragm 310 moves further to the left, carrying rod 312 and V-packing gasket 340 also to the left. Chamber 341, whose left edge is defined by gasket 340 increases in volume causing the hydraulic fluid pressure trapped in the wheel cylinder to be attenuated. At maximum pulse repetition rate diaphragm 310 has moved as far to the left as possible and the volume of chamber 341 has increased to the point where the fluid pressure in the wheel cylinder has been completely relieved and the brake released. Of course, as pulse repetition rate now decreases, the diaphragm returns to the right, first forcing the hydraulic fluid back into the wheel cylinder and finally when the pulse repetition rate has decreased sufficiently, lifting ball 322 from seat 321 once again permitting free communication from the master cylinder to the wheel cylinder. It can thus be seen that brake pressure is related to wheel deceleration, being proportional to wheel deceleration in a critical band of wheel deceleration.

Figure 5:
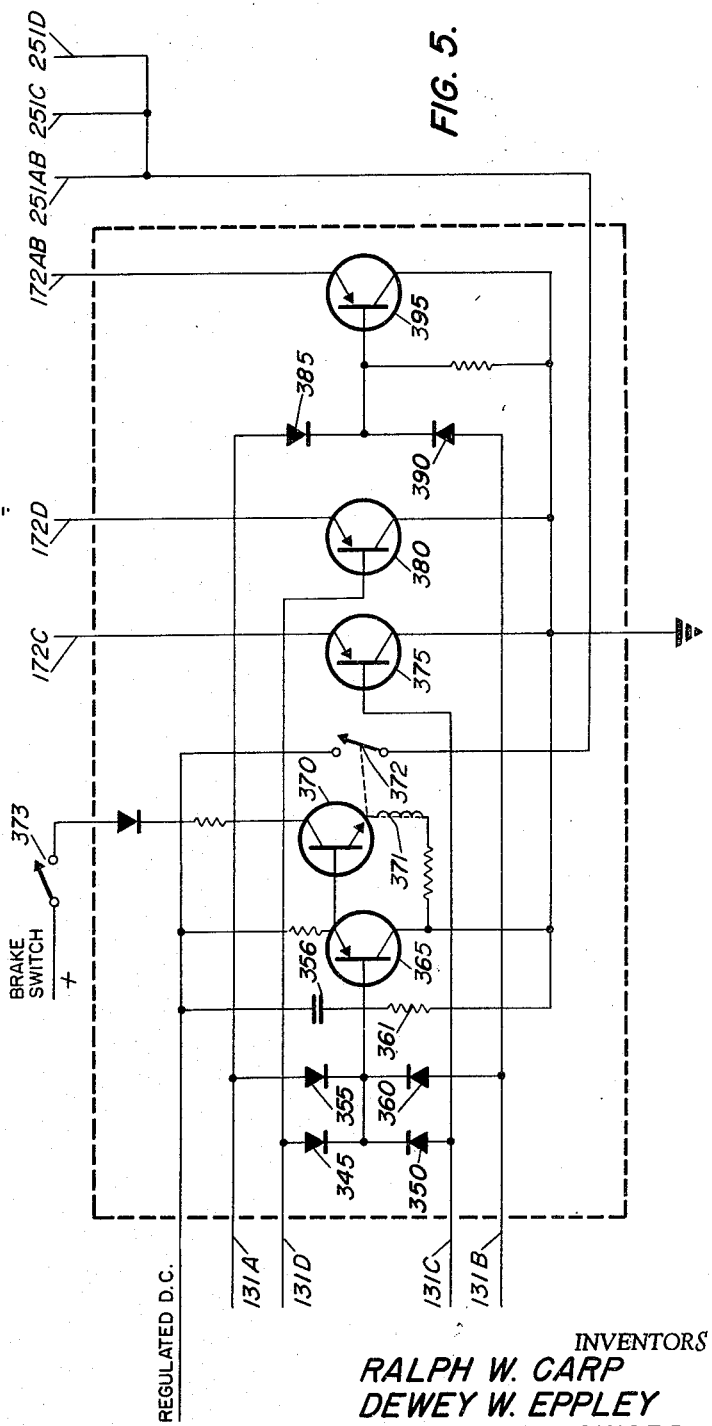
FIG. 5 is a schematic of logic circuitry used with this antiskid system.

On low friction coefficient road surfaces, a violently braked wheel may lock so rapidly that the antiskid system does not have time to respond. If the antiskid system cannot distinguish the locked, skidding wheel from the locked wheel on a stopped vehicle, the wheel will stay locked and the vehicle will continue to skid. Logic circuitry is provided in this antiskid system to release the locked, skidding wheel so as to allow the antiskid system to acquire control to bring the vehicle to a controlled stop even under the most adverse of road/tire conditions. Referring temporarily to FIG. 2, it will be remembered that below a predetermined threshold wheel velocity, the voltage on transistor 130 collector and hence line 131D is close to ground, whereas above the threshold speed collector and line 131D voltage approach regulated D.C. voltage. Referring now to FIG. 5, a schematic of a lock sensing logic system, line 131D, which has been noted senses transistor 130 collector voltage in a control channel of the antiskid system, is seen connected to the anode of diode 345 and to the base of transistor 380. In like manner, lines 131A, 131B and 131C connect similar threshold sensing transistors in like channels of the antiskid system to similar diodes and transistors in the logic circuit. For simplicity of understanding and to avoid redundant explanation, only the operation of the logic circuit when controlled by the threshold signal on line 131D will be pointed out with additional explanation of the operation of the logic circuit when used with a rear axle select system. The operation of the logic circuit in response to threshold signals from other control channels will be readily understood.

In the preferred embodiment, a threshold speed of five miles per hour has been selected. That is to say, with no slip between the wheel and road surface, the threshold speed is that wheel rotation velocity which maintains vehicle velocity at five miles per hour. Below threshold speed, line 131D voltage is close to ground and diode 345 is turned off. Assume now that the vehicle is moving at a velocity in excess of threshold speed with no slip between the wheels and road surface when the brakes are applied. As long as wheel speed is above the threshold a high voltage appears on line 131D forward-biasing diode 345 and back-biasing transistor 380. In like manner, diodes 350, 355 and 360, which together with diode 345 comprise a conventional "OR" gate, and diodes 385 and 390 are forward-biased and transistors 365, 375 so that 395 are back-biased. Since transistor 365 is off, transistor 370 is on and relay coil 371 is energized, causing switch contacts 372 to be closed, thereby supplying regulated D.C. voltage to the pulse generators of FIG. 1 over lines 251AB, 251C and 251D. It will be noted that the emitter-collector path of transistor 380 is connected between ground and the wiper of reference potentiometer 171 seen in FIG. 2, while transistor 375 is similarly located with respect to the reference potentiometer of control channel 43 and transistor 395 is similarly located with respect to the reference potentiometer of combined channels 41 and 42. Since, as has been said, transistors 375, 380 and 395 are turned off, the wipers of the reference potentiometers are not grounded and each control channel operates normally. If, now, one or more wheels should drop below threshold speed, such as for example the wheel sensed by channel 44, while at least one wheel is above threshold speed, transistor 365 will remain off and transistor 370 will remain on so that switch contacts are closed supplying regulated D.C. voltage to the pulse generator of each channel. The wiper of the reference potentiometer of the channel whose wheel is below threshold speed will be grounded. In this example, voltage on line 131D drops, transistor 380 turns on and connects the wiper to ground. The affected channel senses the lowering of the set-point normally introduced by potentiometer 171 which is equivalent to an extremely high deceleration voltage applied to the base of transistor 160 of FIG. 2. The channel in response thereto generates a continuous high level pulse in the manner previously described, causing the pressure modulator to release the fluid pressure in the wheel cylinder of the slow wheel. The slow wheel can then accelerate until it again exceeds threshold speed, at which time the antiskid channel will once more regain normal control.

Since transistor 395, which controls the grounding of the set potentiometer wiper of the combined channels 41 and 42, is controlled by diodes 385 and 390 which in turn are controlled by the rear wheels, it should be clear that neither rear wheel will be released as long as one rear wheel is above threshold speed.

If all wheels should drop below threshold speed, indicating either an extremely low coefficient of friction between the wheels and the road surface or that the vehicle itself has decelerated below threshold speed, diodes 345, 350, 355 and 360 become back-biased. However, the charge stored in capacitor 356 holds transistor 365 non-conductive until this charge can bleed off through resistor 361. This delay is determined by the values of capacitor 356 and resistor 361 and has been set at 50 milliseconds. Simultaneously with the turning off of diodes 345, 350, 355 and 360, transistors 375, 380 and 395 have been turned on, causing the brakes on all wheels to be released. For a period of 50 milliseconds after all wheels drop below threshold speed, therefore, all brakes are released. If the vehicle itself is below threshold speed, the wheels will not accelerate but rather will remain below threshold speed, so that at the termination of the 50 millisecond delay, each pulse generator will be deenergized and the vehicle braking system will revert to conventional operator control. If, however, the vehicle is above threshold speed, at least one wheel upon being released will accelerate above the threshold speed allowing the antiskid system to regain control.

It should be noted that voltage for relay winding 371 is supplied through brake switch 373 so that contacts 372 cannot close until the brake pedal is depressed. The closing of contacts 372 then energizes the pulse generators.

It should be obvious from the description of the preferred embodiment that an individual control channel could be provided for each braked wheel or that through the expediency of using a select circuit such as the rear axle select circuit described, various groups of wheels can be controlled. One skilled in the art can make certain other changes and modifications without departing from the teachings of our invention. We, therefore, intend to cover all such changes and modifications which fall within the true spirit and scope of the appended claims.

The invention claimed is:

1. In a wheeled vehicle having a wheel braking system, whereby said wheel is braked by a braking force, an antiskid system having a source of electrical power and including a control channel comprising:
    means responsive to wheel acceleration for generating an acceleration signal;
    a reference signal;
    means for comparing said acceleration signal with said reference signal to generate an error signal;
    modulation means responsive to said error signal for generating a train of modulation electrical pulses; and
    means responsive to said train of modulated electrical pulses for attenuating said braking force.

2. An antiskid system as recited in claim 1 wherein said means for generating an acceleration signal includes:
    means responsive to wheel velocity for generating a velocity signal; and
    means for differentiating said velocity signal.

3. An antiskid system as recited in claim 2 with additionally:
    a logic circuit responsive to said velocity signal for varying said reference signal and for disabling said antiskid system in a predetermined manner.

4. An antiskid system as recited in claim 1 wherein said means for generating an acceleration signal includes:
    a sensor responsive to wheel rotational velocity for generating a velocity frequency corresponding to said velocity;
    a counter for generating an electrical signal correlative to said velocity frequency; and
    means for differentiating said electrical signal.

5. An antiskid system as recited in claim 4 with additionally:
    a logic circuit responsive to a threshold level of said electrical signal for varying said reference signal in a predetermined manner and for disabling said antiskid system a predetermined time after said electrical signal drops below said threshold level.

6. An antiskid system as recited in claim 4 with additionally:
    means responsive to said velocity frequency for generating a threshold signal at a predetermined velocity frequency; and
    a logic circuit responsive to said threshold signal for varying said reference signal in a predetermined manner and for disabling said antiskid system a predetermined time after said threshold signal ceases to be generated.

7. An antiskid system as recited in claim 6 wherein said reference signal is a normally fixed electrical signal and said logic circuit includes:
    a first transistor having its emitter and collector electrodes connected between said reference signal and ground and having its base electrode connected to said means for generating a threshold signal; and
    a second transistor having its emitter and collector electrodes connected to control electrical power application to said modulation means and having its base electrode connected to said means for generating a threshold signal.

8. An antiskid system as recited in claim 7 with additionally an RC network connected in the base electrode circuit of said second transistor whereby said second transistor responds a predetermined time after said threshold signal ceases to be generated.

9. An antiskid system as recited in claim 6 wherein said reference signal is a normally fixed electrical signal and said logic circuit includes:
    a first transistor responsive to said threshold signal for varying said reference signal in a predetermined manner;
    a first switching means connected between said power source and said modulation means; and
    a second transistor having its emitter and collector electrodes connected to control said first switching means and having its base electrode connected to said means for generating a threshold signal.

10. An antiskid system as recited in claim 9 with additionally a second switching means serially connected with said first switching means, said second switching means being actuated by the braking of said wheel.

11. An antiskid system wherein a plurality of control channels as recited in claim 4 are utilized, each control channel responding to and controlling a different wheel of said vehicle.

12. An antiskid system as recited in claim 11 with additionally logic circuitry comprising:
    a plurality of means, one provided for each said control channel and independently responsive to the velocity of said wheel controlled by said channel for varying said reference signal of said channel; and
    means responsive to said velocity of all said wheels controlled by said control channels for rendering all said channels inoperative.

13. An antiskid system as recited in claim 12 wherein said means for rendering all said channels inoperative functions after a predetermined time delay.

14. An antiskid system as recited in claim 11 wherein each said control channel includes means responsive to said velocity frequency for generating a threshold signal at a predetermined velocity frequency and said antiskid system additionally includes a logic circuit comprising:
    a plurality of means, one for each control channel and independently responsive to said threshold signal generated in its control channel for varying said reference signal of said control channel independently of other control channels; and means dependently responsive to all said threshold signals in said antiskid system for rendering all said control channels inoperative.

15. An antiskid system as recited in claim 14 wherein said dependently responsive means renders all said control channels inoperative a predetermined time after the last said threshold signal is generated.

16. An antiskid system as recited in claim 14 wherein each control channel includes an independent reference signal which is a normally fixed electrical signal and wherein said plurality of means includes a plurality of transistors, one associated with each control channel and having its emitter and collector electrodes connected between said reference signal of said associated control channel and ground and having its base electrode responsive to said threshold signal generated in said transistor's associated control channel.

17. An antiskid system as recited in claim 16 wherein said dependently responsive means includes:
a second transistor having its emitter and collector electrodes connected to control the simultaneous application of electrical power to said modulation means of each said control channel; and,
an "OR" gate having its output connected to the base electrode of said second transistor and having as inputs said threshold signals of each said control channel.

18. An antiskid system as recited in claim 17 with additionally an RC network connected in the base electrode circuit of said second transistor whereby said second transistor responds a predetermined time after the last of said threshold signals ceases to be generated.

19. An antiskid system as recited in claim 1 wherein said means for generating a train of modulated electrical pulses comprises:
a pulse generator for generating a train of electrical pulses; and
means for modulating said pulses in accordance with said error signal.

20. An antiskid system as recited in claim 19 wherein said means for modulating said pulses comprises a pulse repetition rate modulator.

21. An antiskid system as recited in claim 20 wherein said braking force is hydraulically applied from a master cylinder through a hydraulic line to wheel cylinder and said means for attenuating said braking force includes:
a hydraulic fluid pressure modulator interposed in said hydraulic lines between said master cylinder and said wheel cylinder, said modulator being arranged to modulate said hydraulic fluid pressure proportional to said pulse repetition rate over a predetermined pulse repetition rate band.

22. An antiskid system as recited in claim 19, wherein said means for modulating said pulses comprises:
a ramp generator triggered by the trailing edge of said pulses and terminated by said error signal for generating a ramp time base; and
means responsive to the trailing edge of said ramp for triggering said pulse generator.

23. An antiskid system as recited in claim 19 wherein said pulse generator comprises a monostable vibrator and said modulating means includes:
a Miller integrator started by said vibrator assuming its stable state and terminated when said integrator output voltage coincides with said error voltage; and
means responsive to said integrator termination for triggering said vibrator to its unstable state.

24. An antiskid system as recited in claim 19 wherein said pulse generator comprises a monostable vibrator and said modulating means includes:
a ramp voltage generator;
a bistable comparator for comparing said ramp voltage with said error signal;
means connected between said vibrator and said comparator for triggering said vibrator when said ramp voltage coincides with said error voltage; and
means for triggering said ramp generator when said vibrator assumes a first state and for terminating said ramp generator when said vibrator assumes a second state.

25. In an antiskid system having at least a first control channel as recited in claim 1 for controlling at least a first wheel, a hybrid control channel for dependently controlling at least a second and a third wheel including:
means responsive to the acceleration of said second wheel for generating a second acceleration signal;
means responsive to the acceleration of said third wheel for generating a third acceleration signal;
means responsive to said second and third acceleration signals for admitting only one said acceleration signal in accordance with predetermined characteristics of said second and third acceleration signals;
a second reference signal;
a second means for comparing said admitted acceleration signal with said second reference signal to generate a second error signal;
a second modulation means responsive to said second error signal for generating a second modulated electrical train of pulses; and,
a second means responsive to said second train of pulses for attenuating the braking force on said second and third wheels simultaneously.

26. An antiskid system as recited in claim 25 wherein:
said means for generating an acceleration signal includes a first sensor responsive to said first wheel rotational velocity for generating a first velocity frequency;
said means for generating a second acceleration signal includes a second sensor responsive to said second wheel rotational velocity for generating a second velocity frequency;
said means for generating a third acceleration signal includes a third sensor responsive to said third wheel rotational velocity for generating a third velocity frequency.

27. An antiskid system as recited in claim 26 with additionally:
means responsive to said first velocity frequency for generating a first threshold signal at a first predetermined velocity frequency;
means responsive to said second velocity frequency for generating a second threshold signal at a second predetermined velocity frequency;
means responsive to said third velocity frequency for generating a third threshold signal at a third predetermined velocity frequency;
a logic circuit responsive to said first, second, and third threshold signals for varying said first channel reference signal and said second reference signal in a predetermined manner and for disabling said antiskid system a predetermined time after all said threshold signals cease to be generated.

References Cited

UNITED STATES PATENTS

| | | |
|---|---|---|
| 3,026,148 | 3/1962 | Ruof. |
| 3,233,946 | 2/1966 | Lockhart. |
| 3,260,555 | 7/1966 | Packer. |
| 3,338,637 | 8/1967 | Harned et al. |
| 3,398,995 | 8/1968 | Martin _____ 303—20 X |

DUANE A. REGER, Primary Examiner

U.S. Cl. X.R.

303—20; 307—231